(12) United States Patent
Ito et al.

(10) Patent No.: US 6,470,266 B1
(45) Date of Patent: Oct. 22, 2002

(54) VEHICULAR NAVIGATION SYSTEM USING RESTRICTED-TYPE ROAD MAP DATA

(75) Inventors: Motoaki Ito, Toyohashi; Takamitsu Suzuki, Okazaki; Shinji Hiraiwa, Okazaki; Wataru Sugiura, Anjo, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/505,705

(22) Filed: Feb. 17, 2000

(30) Foreign Application Priority Data

Mar. 16, 1999 (JP) ............................................. 11-070443

(51) Int. Cl.$^7$ ............................................. G01C 21/34
(52) U.S. Cl. ....................... 701/209; 701/210; 701/211; 340/990; 340/995
(58) Field of Search ................................. 701/200, 202, 701/207, 208, 209, 210, 211; 73/178 R; 340/988, 990, 995

(56) References Cited

U.S. PATENT DOCUMENTS

| | | | | |
|---|---|---|---|---|
| 5,220,507 A | * | 6/1993 | Kirson ........................ | 701/210 |
| 5,406,490 A | * | 4/1995 | Braegas ....................... | 701/210 |
| 5,428,545 A | * | 6/1995 | Maegawa et al. ............ | 701/210 |
| 5,444,629 A | * | 8/1995 | Kishi et al. ................... | 701/211 |
| 5,737,225 A | * | 4/1998 | Schulte ........................ | 701/211 |
| 5,774,071 A | * | 6/1998 | Konishi et al. .............. | 701/211 |
| 5,845,227 A | * | 12/1998 | Peterson ..................... | 701/209 |
| 5,862,509 A | * | 1/1999 | Desai et al. ................. | 701/209 |
| 5,892,463 A | * | 4/1999 | Hikita et al. ................ | 701/209 |
| 5,911,773 A | * | 6/1999 | Mutsuga et al. ............ | 701/210 |
| 5,935,193 A | * | 8/1999 | Saiki .......................... | 701/211 |
| 5,983,158 A | * | 11/1999 | Suzuki et al. ............... | 701/210 |
| 6,064,926 A | * | 5/2000 | Sarangapani et al. ....... | 701/210 |

FOREIGN PATENT DOCUMENTS

| | | |
|---|---|---|
| JP | A-6-36191 | 2/1994 |
| JP | 6-137881 | 5/1994 |
| JP | A-7-287800 | 10/1995 |
| JP | A-7-325999 | 12/1995 |
| JP | A-8-75495 | 3/1996 |
| JP | A-9-269235 | 10/1997 |
| JP | 10-9886 | 1/1998 |

* cited by examiner

Primary Examiner—Gary Chin
(74) Attorney, Agent, or Firm—Law Offices of David G. Posz

(57) ABSTRACT

In a vehicular navigation system, an electronic control unit uses in its recommended vehicle travel path determination processing restricted-type roads the data of which is less reliable than those of normal roads. A display device indicates the recommended travel path on a road map displayed thereon. When a vehicle travels on the restricted-type road, a travel guidance specific to the restricted-type road is issued to notify a driver of traveling on the restricted-type road and thereby invite the driver to decide himself or herself. The guidance may be in a vocal announcement from a speaker and/or a visual display on the display device.

54 Claims, 5 Drawing Sheets

VEHICULAR NAVIGATION SYSTEM USING RESTRICTED-TYPE ROAD MAP DATA

CROSS REFERENCE TO RELATED APPLICATION

This application relates to and incorporates herein by reference Japanese Patent Application No. 11-70443 filed on Mar. 16, 1999.

BACKGROUND OF THE INVENTION

The present invention relates to a vehicular navigation system which navigates vehicle drivers to a destination along a recommended vehicle travel path.

Various vehicular navigation systems are proposed and used to indicate a recommended vehicle travel path to a destination, thereby navigating vehicle drivers to the destination. The recommended travel path is a series of roads (links) and determined by Dijakstra's algorithm or the like method based on stored road map data. For example, Dijakstra's algorithm calculates costs of each link between two intersections (nodes) and determines the series of links that results in a minimum total vehicle travel cost to the destination.

It is a general practice to determine the recommended travel path by using data of links such as expressways, national roads, prefectural roads, city or town roads, and the like. Some of the above roads are narrow, for one-way traffic or for only pedestrians, and hence are restricted traffic-type. Those restricted-type roads are not used in the recommended travel path determination process, because the restricted-type road data are in many cases incomplete or unreliable to be used.

The conventional vehicular navigation system is thus capable of determining and indicating the recommended travel path only to a point where sufficient road data are available, or indicating the recommended travel path which takes an unnecessary detour, even if some restricted-type roads are in fact available for vehicle travel.

SUMMARY OF THE INVENTION

It is therefore an object of the present invention to provide a vehicular navigation system which ensures determination and indication of a recommended vehicle travel path by using restricted-type road data.

According to the present invention, a vehicular navigation system uses both link information of normal roads and restricted-type roads in determining a recommended travel path to a destination, and a specific guidance indicative of a travel on the restricted-type road when a vehicle travels on the restricted-type road. The restricted-type roads are defined as roads unavailable to vehicle entry, such as one-way traffic roads or narrow roads.

Preferably, the specific guidance is issued upon travel on the restricted-type road in vocal sound or in a mode different from travel on the normal road.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

Figure 1:
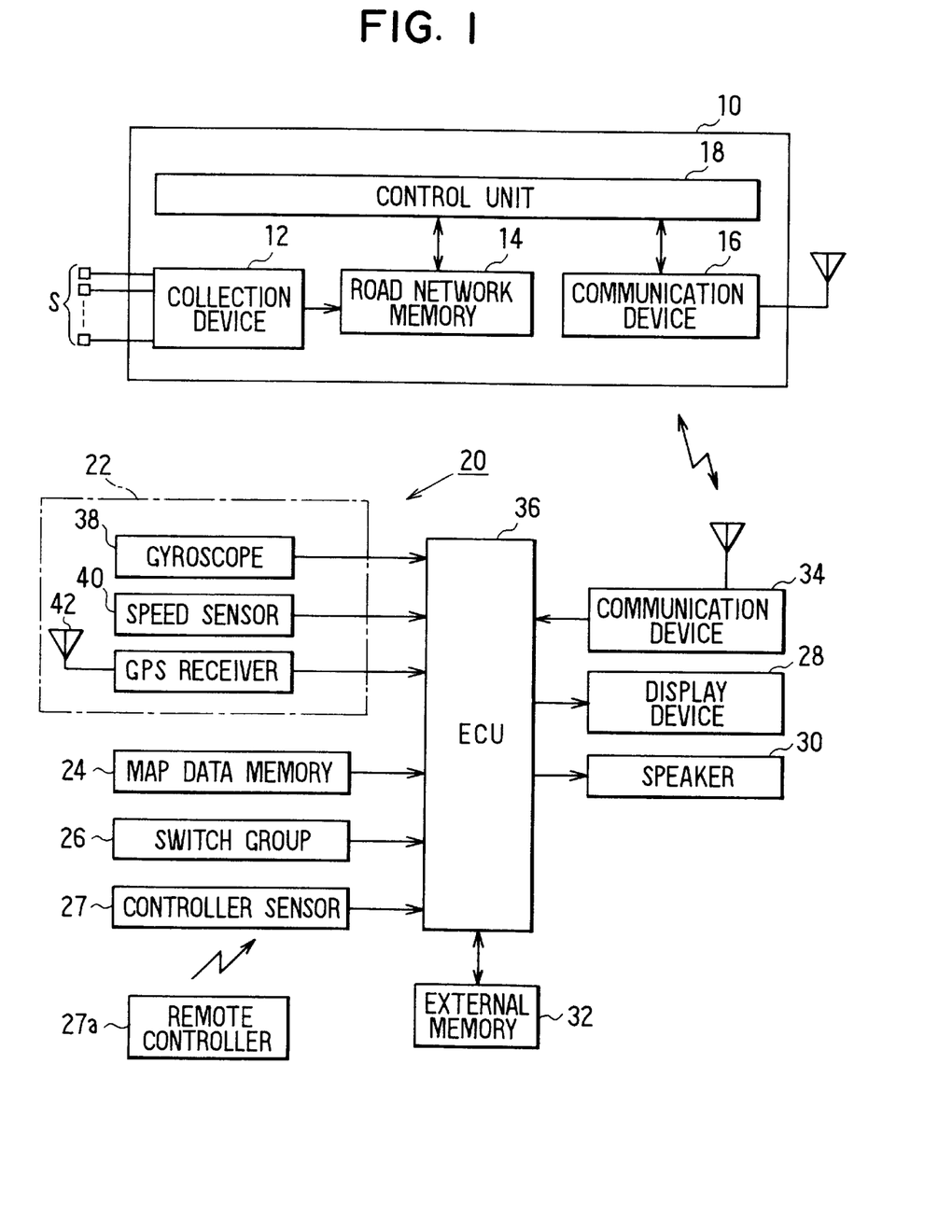
FIG. 1 is a block diagram showing a vehicular navigation system according to an embodiment of the present invention.

Referring first to FIG. 1, a vehicular navigation system is denoted with reference numeral 20. The navigation system 20 includes a position detector 22, a map data memory 24, operation switch group 26, a remote controller sensor 27, a display device 28, speaker 30, an external memory 32, a communication device 34, and electronic control unit (ECU) 36.

The position detector 22 has a gyroscope 38, a vehicle speed sensor 40, and a GPS receiver 42 which detects vehicle positions based on radio signals from satellites. Those devices 38, 40 and 42 are used in combined form to compensate for errors which each device has. The devices may be limited to only one, or additional devices such as a terrestrial magnetism sensor, a steering angle sensor or vehicle wheel speed sensors may be used.

The map data memory 24 stores therein road map data. The map data includes road connection data (road network data), map matching data for improving accuracy of position detection, and the like. The memory 24 may be a CD-ROM, a DVD or the like.

The road network data includes link (road) information, node (intersection) information, and inter-link connection information. The link information comprises a number of information regarding each link. Specifically it comprises a "link ID" which specifies each link, a "link class" which indicates the type of each link, "start point coordinates" and "end point coordinates" of each link, a "link length" indicative of the length of each link, and the like. The link class identify whether a link is an expressway, a national road, a prefectural road, a city or town road, and a restricted-type road. Information about the restricted-type road in the map data memory 24 is generally not complete nor assured by a supplier of the map data with respect to its accuracy, because it is too narrow for a vehicle travel or for other reasons.

The node information comprises a "node ID" which specifies each node connecting the links, information about no right or left turn and about traffic light at each intersection, and the like. The inter-link connection information comprises, for instance, information about no vehicle entry due to one-way traffic. It is to be noted that, in the case of one-way traffic the link is available for vehicle travel from one link but not from another link. Therefore, availability of the link for vehicle travel is determined based on the inter-link connection information.

The operation switch group 26 includes various switches which instruct operation of the navigation system 20.

Specifically, it includes a switch for switching a display content on the display device 28, a switch for setting a destination by a driver, and the like. The switches may be a mechanical-type or a touch sensor-type integrated with the display device 28. The remote controller sensor 27 is provided for receiving signals from a remote controller 27a having various switches through which a driver inputs various commands. The remote controller 27a enables drivers to input the same commands therethrough in the same manner as through the switch group.

The display device 28 is provided to display a road map retrieved from the map data memory 24, a present vehicle position mark detected by the position detector 22, a vehicle travel destination mark, a recommended travel path from the present position to the destination, and the like. The present position mark, the destination mark and the recommended travel path are displayed on the displayed road map.

The speaker 30 is provided to issue travel guidance in vocal sounds in addition to the visual indication by the display device 28. For instance, when a right turn is to be indicated at the next intersection, the display device 28 displays a right-directed mark on the next intersection on the displayed road map and the speaker 30 announces "Please make a right turn at the next intersection".

The communication device 34 is provided to receive information from an information station 10 for a vehicle information and communication system (VICS) and to transmit information to external sites. The information received from the external sites is processed in the electronic control unit 36 to determine the recommended travel path. The communication device 34 may be a customized receiver or a mobile communication device such as a car phone or a cellular phone.

The electronic control unit 36 is a microcomputer which has a CPU, a ROM, a RAM, an I/O, a bus, and the like. The control unit 36 processes signals applied from the position detector 22, the map data memory 24, the switch group 26, the remote controller sensor 27 and the communication device 34 to determine 20 the recommended travel path and to control drive the display device 28 and the speaker 30. The determined recommended travel path is stored in the external memory 32 which is backed up by a battery (not shown).

The information station 10 includes an external condition collection device 12, a road network data memory 14, a communication device 16, and a control unit 18. The information collection device 12 is provided to collect external conditions such as road conditions detected by various sensors S provided along road sides. The network data memory 14 is provided to store various traffic information compiled from various traffic regulations and the external conditions collected by the information collection device 12 as well as a road map in a center area. The communication device 16 is provided to communicate with the navigation system 20 through a wireless device such as a car phone, a cellular phone or the like. The control unit 18 is provided to specify roads which are under traffic regulations or in traffic congestion from the position data (present position and destination) received from the navigation system 20 and the information stored in the road network data memory 14. The control unit 18 transmits this information to the navigation system 20 to be used in the recommended travel path determination.

In the navigation system 20, when a driver inputs a destination of vehicle travel through manipulation of operation switch group 26, the control unit 36 automatically determines the recommended travel path from the present position to the destination and indicates the determined path on the display device 28 and through the speaker 30.

Specifically, the control unit 36 determines the recommended travel path in the following manner. When the driver inputs the destination on the road map displayed on the display device 28, the control unit 36 determines the present position of the vehicle based on satellite data received from the GPS receiver 42. The control unit 36 then determines the shortest travel path from the present position to the destination. The travel path is determined by using the known Dijakstra's algorithm which calculates a travel path of a minimum travel cost.

In the recommended travel path determination using Dijakstra's algorithm, costs (evaluation values) of travel paths from the present position to each node are calculated by using the link information of a link between nodes and connection information between links including traffic regulations. After all path costs are calculated, the links which provide the minimum total path cost are connected as the recommended travel path. The path cost calculation for each link is calculated as "link length×road width coefficient× road type coefficient×congestion rate.

Figure 2:
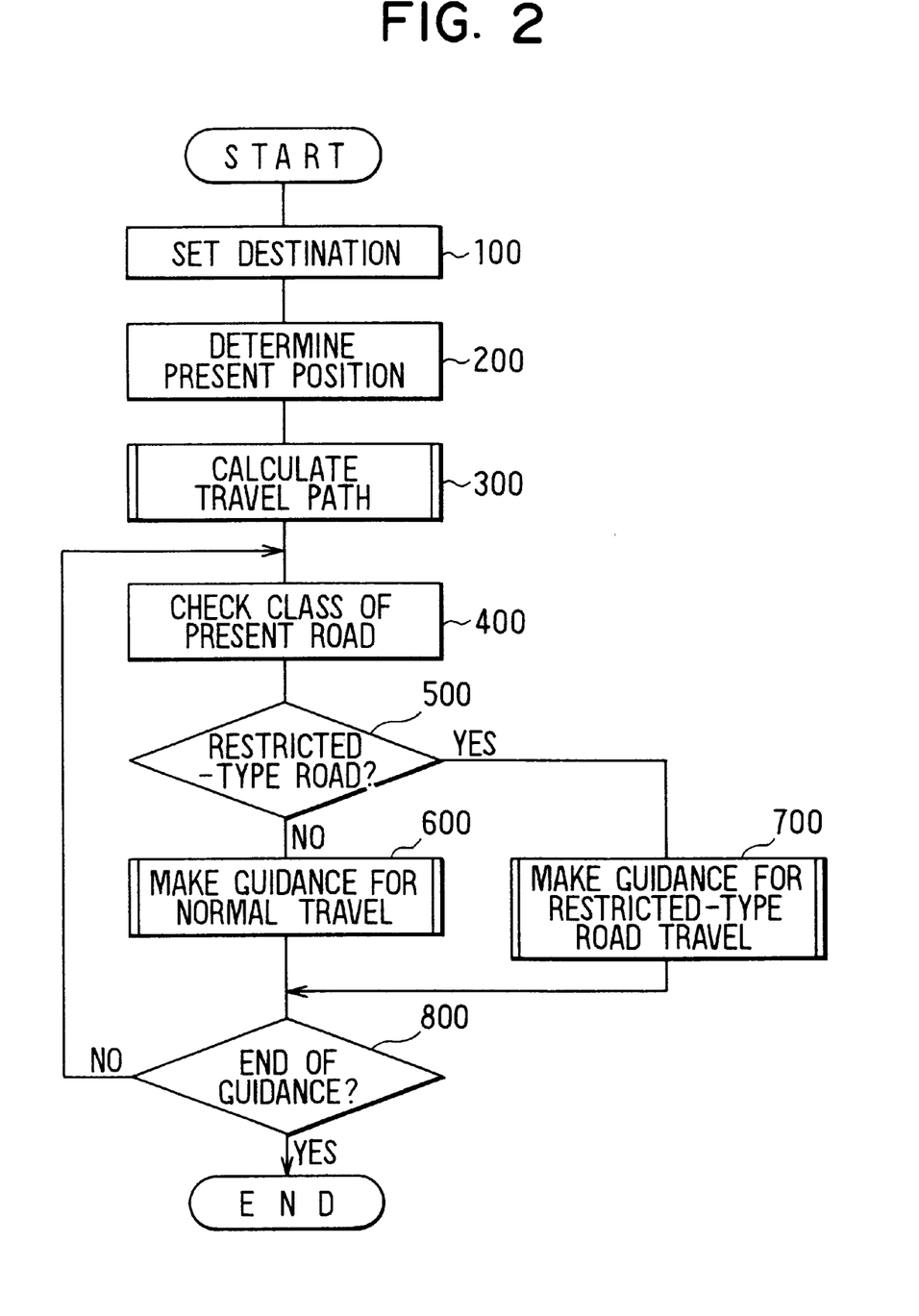
FIG. 2 is a flow diagram showing a recommended travel path determination and indication process executed in the embodiment shown in FIG. 1.

According to the present embodiment, the recommended travel path is determined by using not only link information of normal roads (expressways, national roads, prefectural roads, city or town roads) but also link information of restricted-type roads such as narrow roads. In addition, a travel guidance is made with respect to the restricted-type roads when included in the recommended travel path so that a driver may take appropriate actions at the restricted-type roads. That is, the control unit 36 is programmed to operate as shown in FIG. 2.

The control unit 36 sets a destination at step 100, when a driver inputs a travel destination based on the road map displayed on the display device 28 by manipulating the switch group 26. The control unit 36 then determines at step 200 a present position (travel start point) based on detection data from the position detector 22, and calculates a travel path at step 300.

Figure 3:
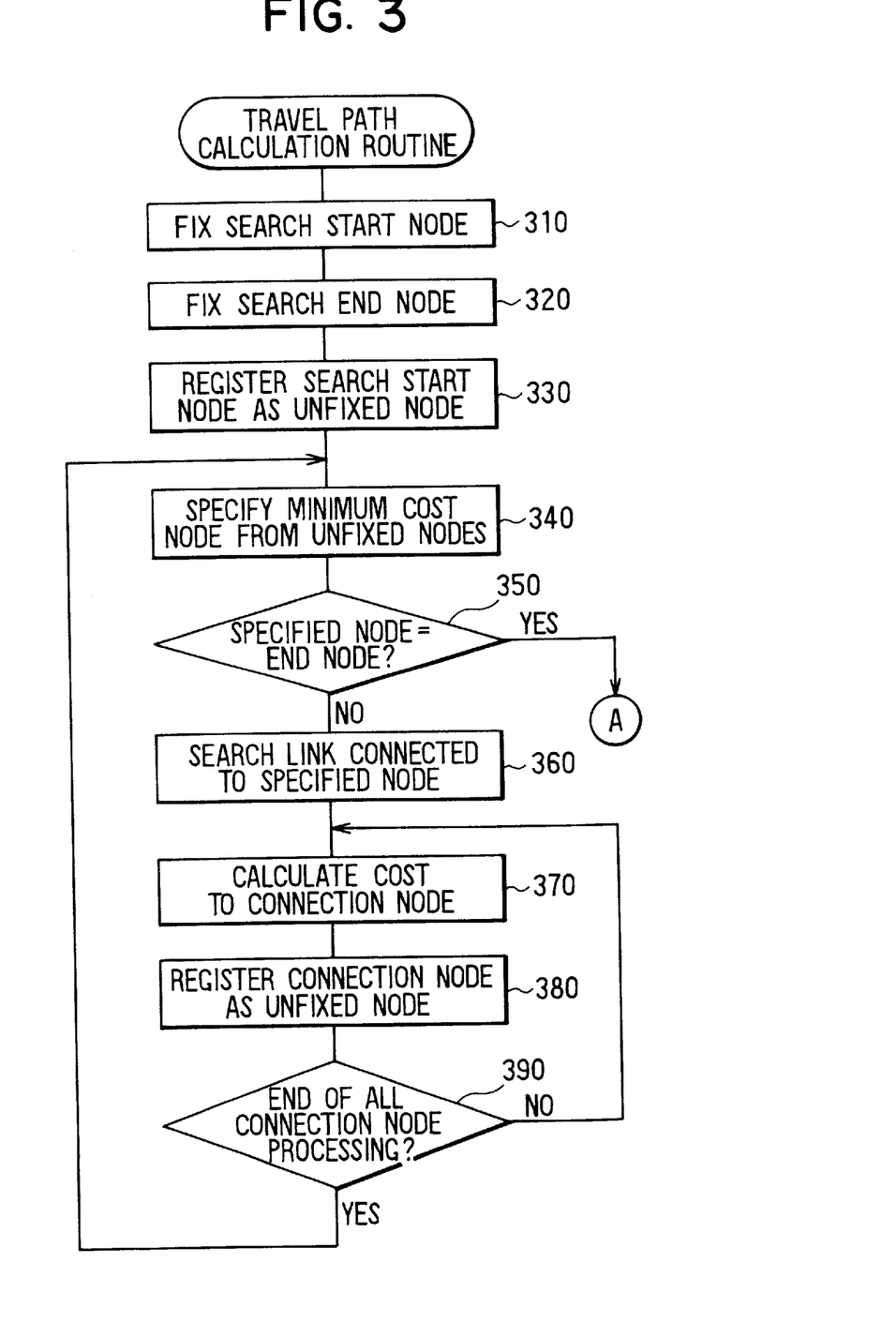
FIG. 3 is a flow diagram showing a first part of the recommended travel path determination process shown in FIG. 2.
Figure 4:
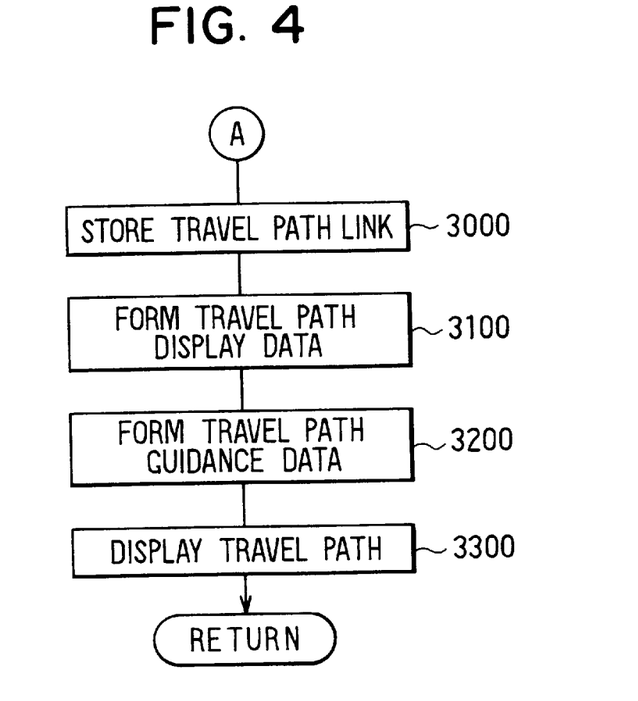
FIG. 4 is a flow diagram showing a second part of the recommended travel path determination process shown in FIG. 2.

In the travel path calculation, as shown in detail in FIGS. 3 and 4, the control unit 36 fixes a search start node at step 310 and fixes a search end node at step 320. Specifically, closest links are searched for from the coordinates of the present position and the destination, respectively, and a reference point on each link is determined by drawing a perpendicular line from the coordinates. One of two nodes of each link which is closer to the reference point is selected to fix as the search start node and the search end node.

The control unit 36 registers the search start node as an unfixed node at step 330, and specifies a minimum cost node among the unfixed nodes at step 340. The control unit 36 checks at step 350 whether the specified node coincides with the search end node, and searches for a link which connects to the specified node at step 360 if the check result at step 350 is NO.

The control unit 36 calculates at step 370 a cost required to travel to the connection node of the searched link (one if there are plural), and registers the connection node as the unfixed node at step 380. The control unit 36 finally checks at step 390 whether the above processing has been completed for all calculated connection nodes. The "calculated connection node" means any node which connects to a node specified as the minimum cost node among the unfixed nodes.

If the check result at step 390 is NO, the control unit 36 repeats steps 370 to 390 with respect to another link. If the check result at step 390 is YES, the control unit 36 repeats steps 340 to 390 until the specified node coincides with the search end node, that is, until the check result at step 350 becomes YES. If the check result at step 350 is YES indicating that the travel path search has been completed, the control unit 36 executes steps 3000 to 3300 shown in FIG. 4.

Figure 5:
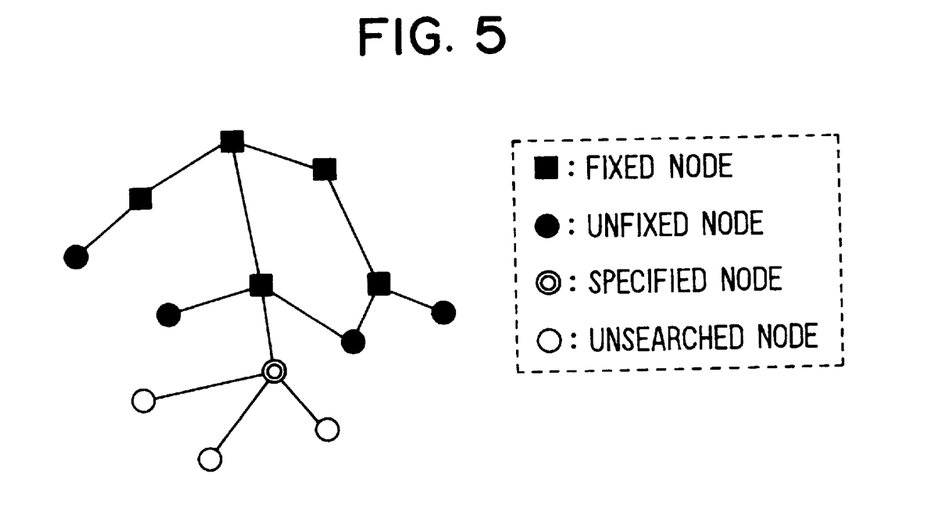
FIG. 5 is a schematic diagram showing the recommended travel path determination process.

The above travel path searching process is shown schematically in FIGS. 5 and 6. In those figures, a fixed node (■), an unfixed node (●), a specified node (◉), and an unsearched node (○) are considered. The fixed node is a node which has been already searched for and fixed in respect of its cost. The unfixed node is a node which has been already searched for but not fixed yet in respect of its cost. The specified node is a node which is selected from the unfixed nodes as the minimum cost node. Based on the specified node as a reference, nodes which connect to the specified node are searched for (step 360 in FIG. 3). The specified node is classified as the fixed node. The unsearched node is a node which has not yet been searched for.

Figures 6A, 6B, 6C:
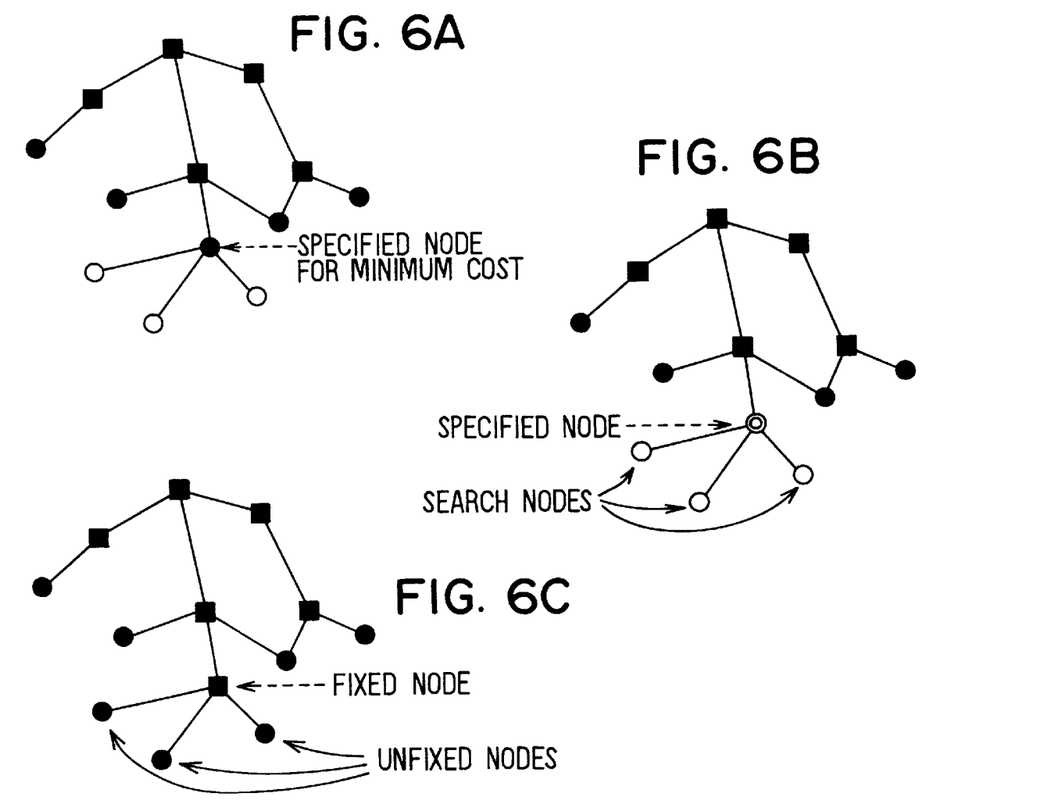
FIGS. 6A to 6C are other schematic diagrams showing the recommended travel path determination process.

It is assumed in FIG. 6A that there are five unfixed nodes (●) which connect to the fixed nodes (■). One of those unfixed nodes (●) which results in the minimum cost node is selected as the specified node (◉) as shown in FIG. 6B. Three unsearched nodes (○) which connect to the specified node (◉) are subjected to a further search, and becomes the unfixed nodes (●) as shown in FIG. 6C. Thus, a travel path from the search start node to the search end node is set for the recommended travel path.

Referring to FIG. 4, the control unit 36 stores at step 3000 the path links set in its processing shown in FIG. 3, and forms at step 3100 a travel path display data based on the stored links. The control unit 36 further forms a travel path guidance data at step 3200, and drives the display unit 28 to indicate the recommended travel path on the displayed road map.

Subsequent to the above travel path calculation step 300 (FIGS. 3 and 4), the control unit 36 checks at step 400 the class of link on which the vehicle is traveling at present, and checks at step 500 whether the present link is classified as the restricted-type road. If the check result at step 500 is NO, the control unit 36 drives at step 600 the display device 28 and the speaker 30 to make normal travel guidance. Thus, for instance, the recommended route to be taken is displayed on the display device 28, and a predetermined vocal announcement is issued from the speaker 30 to indicate in which direction or how the vehicle should turn at the next intersection.

If the check result at step 500 is YES indicating that the present link is classified as a restricted-type road, the control unit 36 drives at step 700 the display device 28 and the speaker 30 to make guidance for a restricted-type road travel in addition to the normal travel guidance made at step 600. The control unit 36 checks at step 800 whether the travel guidance has been completed. If this check result is NO, the control unit 36 repeats the steps 400 to 700 to continue the travel guidance. If this check result is YES indicating that the vehicle has arrived at the destination or the driver has disabled the travel guidance, the control unit 36 terminates its operation.

It is to be noted that the restricted-type road travel guidance at step 700 can be made in the following five exemplary modes which may be adopted singly or in combination.

Figure 7:
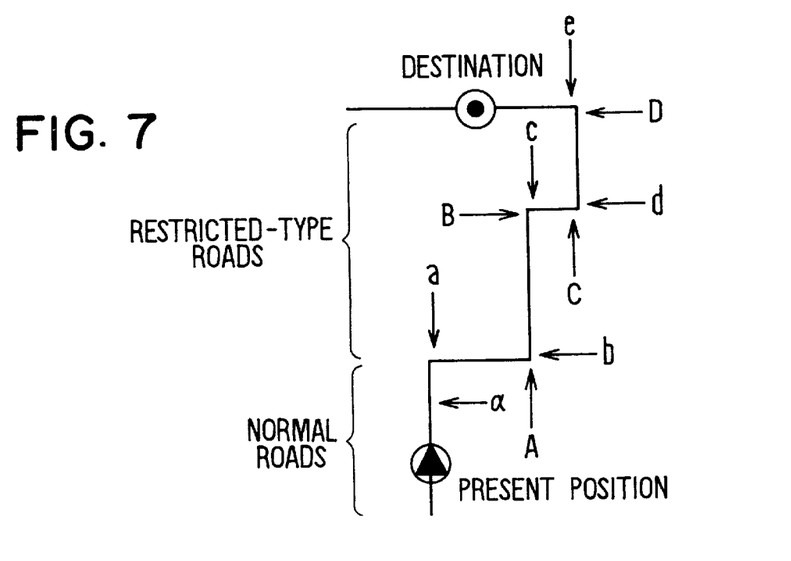
FIG. 7 is a schematic diagram showing timings of indicating restricted-type roads in the embodiment shown in FIG. 1.

(1) The vocal announcement indicating the travel on the restricted-type road is issued from the speaker 30. This announcement may be made only once immediately after the vehicle entered the each link designated as the restricted-type, that is, at each timing or point indicated with "a", "b", "c", "d" and "e" in FIG. 7. It may alternatively be made at regular time or travel intervals while the vehicle is traveling on such roads. It is preferred to make the announcement of "The next road is a restricted-type road." immediately before the vehicle will enter such a road, particularly in the case that the restricted-type roads are connected in series. That is, this announcement is issued at points "A", "B", "C" and "D" shown in FIG. 7.

Another vocal announcement of "Next road is a restricted-type." may also be made during the travel on the normal road, if the next link to which the vehicle moves next is the restricted-type. Specifically, this announcement is made in the course of the normal travel guidance made at step 600, that is, at point "α" in FIG. 7 before the vehicle enters the restricted-type road. If the restricted-type road is a one-way traffic prohibiting an entry from the present road, it may be announced that the vehicle should not enter and make a detour well in advance of traveling too close to the restricted-type road.

(2) A beep sound which is issued before the vocal announcement in the normal travel guidance is changed to a different sound in the case of the restricted-type road travel.

(3) The announcement may be differentiated from the normal guidance in the case of the restricted-type road travel. For instance, the announcement may be "If possible, please turn left at the next intersection." With this kind of announcement which invites a driver's own decision, the driver is enabled to understand the surrounding road conditions.

(4) A message indicating that the vehicle is traveling on the restricted-type road may be displayed on the display device 28. It is preferred to display it continuously while the vehicle is traveling on the restricted-type road. Continuation of this message display will bother drivers less than a repetition of vocal announcements.

It is a general practice to display an enlarged intersection map when the vehicle approaches to the intersection. It is also preferred to maintain the above message on the enlarged intersection map.

(5) The background color of the display device 218 may be changed between the normal road travel and the restricted-type road travel, so that drivers may notice that the vehicle is traveling on the restricted-type road from the change in color.

According to the present embodiment, all road map data stored in the road map memory 24 is used to determine the recommended travel path to the destination, whether the data of each road is reliable or unreliable, that is, whether each road is a normal or restricted-type. If the restricted-type road is included in the recommended travel path, the travel guidance is differentiated from the normal one to indicate a travel on the restricted-type road. If the restricted-type road prohibits entry of vehicles, the driver can determine a detour himself or herself. Further, if the restricted-type road is in fact available to vehicle travel, the driver can take the restricted-type road while ensuring the shortest and minimum cost path to the destination.

The above embodiment may be modified as follows.

In addition to the vocal announcement that the vehicle is approaching to and/or traveling on the restricted-type road, another vocal announcement may be made to indicate that the vehicle is approaching to or has entered the normal road.

The road map data regarding the restricted-type roads may be used optionally in response to a driver's command made through the operation switch group. The color of the recommended travel path may be differentiated between the normal roads and the restricted-type roads on the display device.

The present invention should not be limited to the above embodiment and modifications, but may be implemented in various other ways without departing from the spirit of the invention.

What is claimed is:

1. A vehicular navigation system comprising:
    memory means for storing link information of links which connect nodes and connection information of each connection between the links, the links including normal roads and restricted-type roads, the connection information of the normal roads being complete, the connection information of the restricted-type roads being insufficient;
    control means for determining a travel path to a destination from the link information and the connection information; and
    indicator means for indicating the travel path,
    wherein the control means is constructed to use both the link information and the connection information of the normal roads and the restricted-type roads in determining the travel path, and
    wherein the indicator means is constructed to issue a notification that the road is a restricted-type road and specific guidance for of the restricted-type road when included in the travel path to a driver before the entry to the restricted-type road, after the entry to the restricted-type road, or both before and after the entry to the restricted-type road.

2. A vehicular navigation system of claim 1, wherein the indicator means includes a speaker which indicates the travel path and issues the specific guidance in vocal sound upon travel on the restricted-type road.

3. A vehicular navigation system of claim 1, wherein the indicator means includes a speaker which indicates the travel path in vocal sound, and the indicator means issues the specific guidance upon travel on the restricted-type road in a mode different from travel on the normal road.

4. A vehicular navigation system of claim 3, wherein the indicator means further includes a display device which displays the travel path and the specific guidance thereon.

5. A vehicular navigation system of claim 4, wherein the display device is constructed to change a color of its display between travels on the normal roads and the restricted-type roads.

6. A vehicular navigation system of claim 1, wherein the control means is constructed to use the link information of the restricted-type roads only when instructed externally to use the link information of the restricted-type roads.

7. A vehicular navigation system of claim 1, wherein the control means is constructed to calculate travel costs from the link information and the connection information and determine the travel path by connecting links which provide a minimum cost.

8. A vehicular navigation system of claim 1, wherein the restricted-type roads include roads normally not suitable to vehicle entry.

9. A vehicular navigation system of claim 7, wherein the restricted-type roads include one-way traffic roads and narrow roads.

10. A vehicular navigation system of claim 1, wherein the restricted-type roads include narrow roads, the information for which is insufficient to ensure vehicle travel therethrough.

11. A vehicular navigation system of claim 1, wherein the memory means does not store information of traffic regulations of the restricted-type roads.

12. A vehicular navigation system of claim 1, wherein the specific guidance includes voice guidance indicating a nature of the restricted-type road.

13. A vehicular navigation system of claim 1, wherein the restricted-type roads are roads selected from the group consisting of roads only for pedestrians, roads typically considered too narrow for vehicle travel, and roads for which the memory means has little or no information.

14. A vehicular navigation system of claim 13, wherein the link information comprises a link ID, a link class and a link length, wherein the link ID specifies each link, the link class identifies whether the road is a normal road or restricted-type road, and the link length indicates the length of each link.

15. A vehicular navigation system of claim 1, wherein the specific guidance includes information about the approaching restricted-type road.

16. A vehicular navigation system of claim 1, wherein the specific guidance is issued upon entering the restricted-type road and includes information of entry onto the restricted type road.

17. A vehicular navigation system of claim 1, wherein the specific guidance includes information of traveling on the restricted-type road while traveling on the restricted type road.

18. A vehicular navigation system of claim 1, wherein the indicator means indicates traveling on the normal road right immediately after exiting the restricted-type road and entering the normal road.

19. A vehicular navigation system of claim 1, further comprising a switch through which a command, indicative of whether use of the restricted-type road is allowed, is inputted, the travel path being determined according to the command.

20. A vehicular navigation system of claim 1, wherein the control means determines a new travel path after the current travel path deviates from the originally determined travel path upon entering the restricted-type road that is included in the original travel path.

21. A vehicular navigation system of claim 1, wherein the navigation system facilitates human intervention to further allow the control means to determine the travel path based upon a present restriction status of the restricted-type road.

22. A vehicular navigation system of claim 1, wherein the travel path is further determined based upon a present restriction status of the restricted-type road.

23. A vehicular navigation system of claim 1, wherein the restricted-type roads are roads that are predetermined to be unavailable for traffic.

24. A vehicular navigation system of claim 1, wherein the restricted type roads are roads for which road map data and traffic regulations are unavailable.

25. A vehicular navigation system of claim 1, wherein the restricted-type roads include roads that are more narrow than the normal roads.

26. A vehicle navigation system electronic control unit for determining a vehicle travel route to a desired destination from link information stored away in memory comprised of links which connect nodes and connection information of each connection between the links;
    the links including normal roads for which map information is widely available and restricted-type roads for which map information is insufficient;
    the connection information for the restricted-type roads being less than that of the normal roads;
    the control unit determining a vehicle travel route using both the link information and the connection information for both the normal roads and the restricted-type roads; and
    the control unit further determining a new vehicle travel route if a current travel route is deviated from the original determined travel route in response to a present restriction of the restricted-type road.

27. A vehicle navigation system electronic control unit of claim 26, wherein the nodes are particular intersections on the vehicle travel route, and the travel route is calculated using Dijakstra's algorithm.

28. A vehicle navigation system electronic control unit for determining a vehicle travel route to a desired destination from link information stored in a memory comprised of links which connect nodes and connection information of each connection between the links;

the links including normal roads for which map information is widely available and restricted-type roads for which map information is insufficient;

the control unit determining a vehicle travel route using both the link information and the connection information for both the normal roads and the restricted-type roads; and the control unit further determining a new vehicle travel route if a current travel route is deviated from the original determined travel route in response to a present restriction of the restricted-type road.

29. A vehicular navigation system comprising:

a memory device that stores link information of links which connect nodes and connection information of each connection between the links, the links including normal roads and restricted-type roads, the connection information of the normal roads being complete, the connection information of the restricted-type roads being insufficient;

a control unit that determines a travel path to a destination from the link information and the connection information; and an indicator that indicates the travel path, wherein the control unit is constructed to use both the link information and the connection information of the normal roads and the restricted-type roads in determining the travel path, and wherein the indicator is constructed to issue a notification that the road is a restricted-type road and specific guidance for the restricted-type road when included in the travel path to a driver before the entry to the restricted-type road, after the entry to the restricted-type road, or both before and after the entry to the restricted-type road.

30. A method for navigating a vehicle comprising steps of:

determining a travel path to a destination from link information of links stored in a memory that include normal roads and restricted-type roads that connect nodes, from complete connection information of the normal roads and from insufficient connection information of the restricted-type roads wherein:

guiding the vehicle along the travel path; and issuing a notification that the road is a restricted-type road and specific guidance for the restricted-type road when included in the travel path to a driver before the entry to the restricted-type road, after the entry to the restricted-type road, or both before and after the entry to the restricted-type road.

31. A method of claim 30, wherein the issuing of a specific guidance indicative of the restricted-type road when included in the travel path to a driver before the entry to the restricted-type road, after the entry to the restricted-type road, or both before and after the entry to the restricted-type road further comprises issuing the specific guidance through indicator means for indicating the travel path.

32. A method of claim 30, wherein the issuing of a specific guidance indicative of the restricted-type road when included in the travel path to a driver before the entry to the restricted-type road, after the entry to the restricted-type road, or both before and after the entry to the restricted-type road further comprises issuing the specific guidance in vocal sound upon travel on the restricted-type road.

33. A method of claim 30, wherein the issuing of a specific guidance indicative of the restricted-type road when included in the travel path to a driver before the entry to the restricted-type road, after the entry to the restricted-type road, or both before and after the entry to the restricted-type road further comprises:

issuing the specific guidance through a speaker for indicating the travel path in vocal sound; and indicating the specific guidance upon travel on the restricted-type road in a mode different from travel on the normal road.

34. A method of claim 30, wherein the issuing of a specific guidance indicative of the restricted-type road when included in the travel path to a driver before the entry to the restricted-type road, after the entry to the restricted-type road, or both before and after the entry to the restricted-type road further comprises:

issuing the specific guidance through a speaker for indicating the travel path in vocal sound;

indicating the specific guidance upon travel on the restricted-type road in a mode different from travel on the normal road; and displaying the travel path and the specific guidance through a display device.

35. A method of claim 34, wherein the displaying of the travel path and the specific guidance through a display device further comprises changing a color of a display of the display device between travels on the normal roads and the restricted-type roads.

36. A method of claim 30, wherein the determining of a travel path to a destination from link information of links that include normal roads and restricted-type roads that connect nodes, from complete connection information of the normal roads and from insufficient connection information of the restricted-type roads further comprises:

utilizing the link information of the restricted-type roads in determining the travel path only when instructed externally to use the link information of the restricted-type roads.

37. A method of claim 30 further comprising steps of:

calculating travel costs from the link information and the connection information; and determining the travel path by connecting the links which provide a minimum cost.

38. A method of claim 30, wherein the determining of a travel path to a destination from link information of links that include normal roads and restricted-type roads that connect nodes, from complete connection information of the normal roads and from insufficient connection information of the restricted-type roads further comprises:

determining the travel path from the link information of the restricted-type roads that are normally not suitable to vehicle entry.

39. A method of claim 30, wherein the determining of a travel path to a destination from link information of links that include normal roads and restricted-type roads that connect nodes, from complete connection information of the normal roads and from insufficient connection information of the restricted-type roads further comprises:

determining the travel path from the link information of the restricted-type roads that are one-way traffic roads and narrow roads.

40. A method of claim 30, wherein the determining of a travel path to a destination from link information of links that include normal roads and restricted-type roads that connect nodes from complete connection information of the normal roads and from insufficient connection information of the restricted-type roads further comprises:

determining the travel path from the link information of the restricted-type roads that are narrow roads, the information for which is insufficient to ensure vehicle travel therethrough.

41. A method of claim 30, wherein the issuing of a specific guidance indicative of the restricted-type road when included in the travel path to a driver before the entry to the restricted-type road, after the entry to the restricted-type road, or both before and after the entry to the restricted-type road further comprises issuing voice guidance indicating a nature of the restricted-type road.

42. A method of claim 30, wherein the determining of a travel path to a destination from link information of links that include normal roads and restricted-type roads that connect nodes from complete connection information of the normal roads and from insufficient connection information of the restricted-type roads further comprises:

determining the travel path to the destination from the link information of links that connect particular intersections on the vehicle travel path; and calculating the travel path by using Dijakstra's algorithm.

43. A method of claim 30 wherein the determining of a travel path to a destination from link information of links that include normal roads and restricted-type roads that connect nodes from complete connection information of the normal roads and from insufficient connection information of the restricted-type roads further comprises:

determining the travel path from the link information of the restricted-type roads that are roads selected from the group consisting of roads only for pedestrians, roads typically considered too narrow for vehicle travel, and roads for which there is little or no information available.

44. A method of claim 43, wherein the determining of a travel path to a destination from link information of links that include normal roads and restricted-type roads that connect nodes from complete connection information of the normal roads and from insufficient connection information of the restricted-type roads further comprises:

determining the travel path to the destination from the link information that further includes a link ID specifying each link, a link class identifying whether the road is the normal road or the restricted-type road and a link length indicating the length of each link.

45. A method of claim 30, wherein the issuing of a specific guidance indicative of the restricted-type road when included in the travel path to a driver before the entry to the restricted-type road, after the entry to the restricted-type road, or both before and after the entry to the restricted-type road further comprises issuing specific guidance that includes information about the approaching restricted-type road.

46. A method of claim 30, wherein the issuing of a specific guidance indicative of the restricted-type road when included in the travel path to a driver before the entry to the restricted-type road, after the entry to the restricted-type road, or both before and after the entry to the restricted-type road further comprises issuing the specific guidance upon entering the restricted-type road and issuing information of entry onto the restricted type road.

47. A method of claim 30, wherein the issuing of a specific guidance indicative of the restricted-type road when included in the travel path to a driver before the entry to the restricted-type road, after the entry to the restricted-type road, or both before and after the entry to the restricted-type road further comprises issuing specific guidance that includes information of traveling on the restricted-type road while traveling on the restricted type road.

48. A method of claim 30, wherein the issuing of a specific guidance indicative of the restricted-type road when included in the travel path to a driver before the entry to the restricted-type road, after the entry to the restricted-type road, or both before and after the entry to the restricted-type road further comprises issuing the specific guidance through indicator means for indicating the travel path and indicating travel on the normal road immediately after exiting the restricted-type road and entering the normal road.

49. A method of claim 30, wherein the determining of a travel path to a destination from link information of links that include normal roads and restricted-type roads that connect nodes, from complete connection information of the normal roads and from insufficient connection information of the restricted-type roads further comprises:

determining of the travel path according to a command indicative of whether use of the restricted-type road is allowed.

50. A method of claim 30 further comprising a step of determining a new travel path after the current travel path deviates from the original determined travel path upon entering the restricted-type road that is included in the original travel path.

51. A method of claim 30, wherein the determining of a travel path to a destination from link information of links that include normal roads and restricted-type roads that connect nodes, from complete connection information of the normal roads and from insufficient connection information of the restricted-type roads further comprises:

determining the travel path based upon a present restriction status of the restricted-type road.

52. A method of claim 30, wherein the determining of a travel path to a destination from link information of links that include normal roads and restricted-type roads that connect nodes from complete connection information of the normal roads and from insufficient connection information of the restricted-type roads further comprises:

determining the travel path from the link information of the restricted-type roads that are roads that are predetermined to be unavailable for traffic.

53. A method of claim 30, wherein the determining of a travel path to a destination from link information of links that include normal roads and restricted-type roads that connect nodes, from complete connection information of the normal roads and from insufficient connection information of the restricted-type roads further comprises:

determining the travel path from the link information of the restricted-type roads for which road map data and traffic regulations are unavailable.

54. A method of claim 30, wherein the determining of a travel path to a destination from link information of links that include normal roads and restricted-type roads that connect nodes, from complete connection information of the normal roads and from insufficient connection information of the restricted-type roads further comprises:

determining the travel path from the link information of the restricted-type roads that are more narrow than the normal roads.

* * * * *